Sept. 8, 1953
C. H. O. BERG ET AL
2,651,666
ADSORPTION PROCESS
Filed April 5, 1948
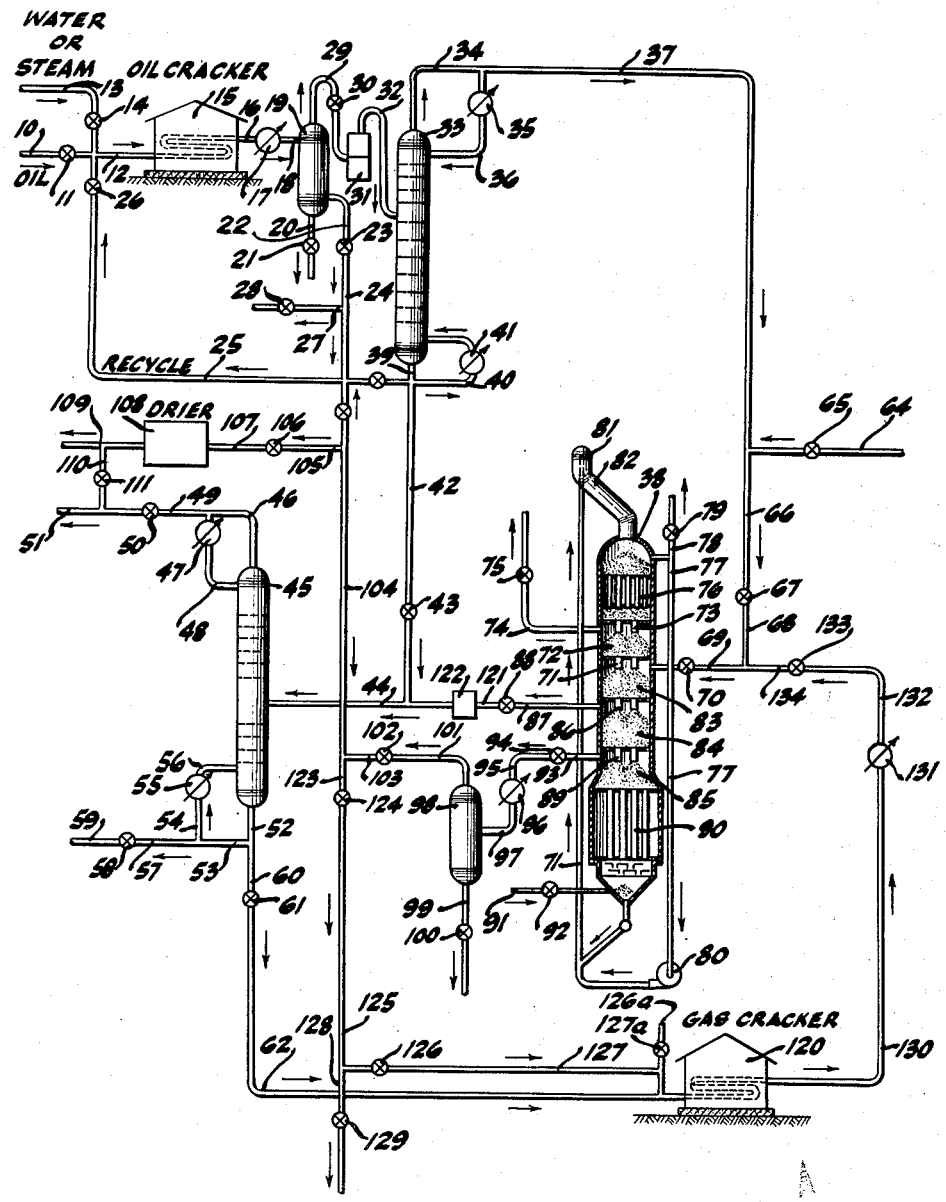
INVENTOR.
CLYDE H. O. BERG.
BY DONALD H. IMHOFF
*Milton W. Lee*
AGENT Patented Sept. 8, 1953

2,651,666

UNITED STATES PATENT OFFICE 2,651,666

ADSORPTION PROCESS

Clyde H. O. Berg and Donald H. Imhoff, Long Beach, Calif., assignors to Union Oil Company of California, Los Angeles, Calif., a corporation of California Application April 5, 1948, Serial No. 18,914

8 Claims. (Cl. 260—683)

This invention relates to a process for the separation of gaseous mixtures by continuous selective adsorption and particularly concerns the separation of gaseous mixtures of saturated and unsaturated hydrocarbons produced by pyrolysis of various hydrocarbon fractions. The improved process as herein described further pertains to a combination method for producing and purifying gaseous hydrocarbon mixtures for the production of substantially pure unsaturated hydrocarbons well suited for conversion to synthetic organic chemicals and other valuable derivatives.

The selective adsorption process for the separation of gaseous mixtures is based upon preferential adsorption phenomena exhibited by certain granular adsorbents in which the tendency for certain gases to be more strongly adsorbed than other gases is noted. With respect to the low molecular weight hydrocarbons such as those having less than about five carbon atoms per molecule and including paraffins, olefins and the diolefins, the degree of adsorbability increases as the molecular weight or the normal boiling point. In the nonhydrocarbon gases including hydrogen, nitrogen, oxygen, carbon monoxide, carbon dioxide, sulfur dioxide, hydrogen sulfide, helium, and the like, adsorbents tend to adsorb those having the higher critical temperatures in preference to those having lower critical temperatures. In some instances the adsorbtivity correlation may be made as a function of Van der Waals' constant "$a$."

The process of selective adsorption is particularly well adapted to the separation of gaseous mixtures since distinct advantages are offered over the conventional separation processes by distillation, extraction, and adsorption. In the application of distillation and extraction, elevated pressures and low temperatures are often required to effect at least a partial liquefaction of the mixture to be separated. In gaseous mixtures which contain substantial proportions of components having low critical temperatures, the temperatures and pressures required are often extreme. Refrigeration and compression required to process gaseous mixtures by distillation, for example, are very expensive operations, operations which are substantially reduced or eliminated when the process of selective adsorption is employed.

It is an object of the present invention to provide an improved process of selective adsorption for the separation of gaseous mixtures and particularly for the separation of substantially pure unsaturated hydrocarbons as raw materials for synthetic chemical production.

It is another object of this invention to provide a combination pyrolysis, distillation, and selective adsorption process in which a hydrocarbon fraction is cracked to form a mixture of normally gaseous unsaturated hydrocarbons having from 1 to 5 carbon atoms per molecule and an efficient separation of the resulting cracked gases is made.

A further object of this invention is to improve the efficiency of ethylene production from gases resulting from the pyrolytic conversion of hydrocarbon fractions.

Other objects and advantages of the present invention will become apparent to those skilled in the art as the description thereof proceeds.

Briefly, the present invention comprises a selective adsorption process which is especially well adapted to cofunction with distillation and hydrocarbon pyrolysis processes for the efficient production and recovery of unsaturated hydrocarbons such as acetylene, ethylene, propylene, and the like. This invention further comprises the combination of a pyrolysis process in which a normally gaseous or liquid hydrocarbon or hydrocarbon fraction is decomposed to form unsaturated hydrocarbon constituents and the recovery of individual gaseous unsaturated hydrocarbons by a combination distillation and selective adsorption process. A particular modification of this invention comprises a process for the pyrolysis of a hydrocarbon oil fraction to form a cracked liquid effluent including cracked gases and liquids, the distillation of the effluent to form a first overhead fraction and a first bottoms fraction, subsequently redistilling the first bottoms fraction to produce ethylene as a substantially pure second overhead product, and simultaneously treating the first overhead product in a selective adsorption process to recover further quantities of ethylene to be combined with the second overhead product. In another modification of this invention, the selective adsorption process is employed directly to fractionate the cracked gas effluent from a normally gaseous hydrocarbon pyrolysis operation to separate a plurality of fractions including hydrogen, methane, ethylene and ethane and higher molecular weight products, subsequently distilling ethylene and ethane fractions to form substantially pure ethylene as an overhead product, and returning the ethane bottoms product and other selected fractions to the pyrolysis unit for retreatment. These two modifications are preferably accomplished simultaneously to effect the highest production of the desirable unsaturated hydrocarbons by separating the gaseous mixtures of such hydrocarbons by selective adsorption. This invention further comprises the combination, as hereinafter more fully described, of a distillation process and selective adsorption process with pyrolysis processes which is especially efficient in the production of valuable low molecular weight high purity unsaturated hydrocarbon constituents.

The particular advantages inherent in the process of the present invention are the material reduction in the refrigeration demand of distillation operation conditions and the reduction in operating pressure permitted when a selective adsorption process is employed either alone or in conjunction with distillation recovery processes.

One modification of this invention involves the selective adsorption processing of a demethanizer column overhead product for the recovery of ethylene in which the pyrolysis effluent comprises the demethanizer feed. The degree of refrigeration required in the demethanizer column is materially reduced by allowing a portion of the ethylene normally produced with the bottoms product to go overhead with the methane and hydrogen as the overhead product and to be subsequently treated in the selective adsorption column at very much reduced pressures and near atmospheric temperatures. Such operations are particularly well suited when liquid hydrocarbon fractions such as gas oils and the like are pyrolytically treated.

In another modification of this invention which involves pyrolysis of normally gaseous hydrocarbon fractions such as methane, ethane, propane, butane, and the like, the pyrolysis effluent may be treated directly by the process of selective adsorption for the production of substantially pure acetylene, ethylene, propylene, and like unsaturated hydrocarbons. If desirable, the selective adsorption process may be employed to produce a mixed $C_2$ hydrocarbon fraction which may be combined as feed to an ethylene fractionator as above described to separate a substantially pure ethylene overhead product by low temperature fractionation.

The principles, advantages, and methods of utilization of this invention will be more clearly understood by reference to the accompanying schematic flow diagram of the combined pyrolysis distillation and selective adsorption process.

Referring now more particularly to the drawing, the preferred modification is shown in which normally liquid hydrocarbon fractions or normally gaseous hydrocarbon fractions, or both fractions simultaneously may be pyrolyzed for the production of unsaturated normally gaseous hydrocarbons in substantially pure form. Reference will be made at present to a method involving the vapor phase cracking of a normally liquid hydrocarbon oil such as gas oil in the presence of steam, although it must be understood that the cracked effluent may be obtained from either thermal or catalytic cracking in the liquid or the vapor phase of hydrocarbon fractions boiling from as low as about 100° F. to as high as 1000° F. such as naphthas, light and heavy gas oils, fuel oils, residual oils, reduced crude oils and the like.

The gas oil is vaporized by heating to a temperature in excess of about 760° F. in a heater, not shown, and is passed by means of line 10, controlled by valve 11 into inlet manifold 12. If desirable, steam or water in the ratio of two pounds of water per pound of gas oil may be introduced into inlet manifold 12 by means of line 13 controlled by valve 14 to form a gas oil-steam mixture. This vapor mixture is passed through cracking zone 15 labeled "oil cracker" and heated to a temperature of between about 1000° F. and 2500° F. at the coil outlet, for a gas oil a temperature of between about 1300° F. and 1900° F. is suitable. The cracked material thus produced is removed through line 16 and passed into cooling zone 17 wherein the cracked effluent is cooled and at least a portion thereof is condensed. The water added to the gas oil cracking stock generates steam which materially inhibits excessive coking when cracking of gas oil to form gas is carried out. Other stocks mentioned above may be employed as well as gas oil and for the higher boiling oils the cracking temperature may be reduced to the lower end of the temperature range given above.

Cooling zone 17 may comprise feed stream interchangers whereby a portion of the heat removed with the cracked effluent is used in heating the entering feed vapor mixture. Cooling zone 17 may comprise a water or oil quench or other suitable means for effecting efficient cooling of the cracked effluent. In the vapor phase cracking of steam-gas oil vapor mixtures, the water quench is generally preferred. The cooled effluent is passed from cooling zone 17 through line 18 into gas liquid separator 19 wherein the condensed and uncondensed portions of the effluent are separated. When a water quench is employed, the water condensate is removed by means of line 20 controlled by valve 21 which is actuated by a differential liquid level controller not shown. The condensed oil fraction is removed by means of line 22 controlled by valve 23 actuated by a liquid level controller, not shown. The oil fraction thus removed may be recirculated through lines 24 and 25 controlled by valve 26 to the cracking zone inlet or it may be removed by means of line 27 controlled by valve 28 and sent to storage or further processing facilities, not shown.

The uncondensed fraction of the cracked effluent is removed from separator 19 by means of line 29 controlled by valve 30 and is introduced into drying zone 31 wherein remaining traces of moisture are removed. Drying zone 31 may comprise a series of towers filled with a desiccant such as activated aluminum oxide, silica gel, activated charcoal or other. The anhydrous cracked gases thus formed are refrigerated by means not shown and passed by means of line 32 into demethanizer tower 33. Demethanizer 33 operates at a pressure of about 600 pounds per square inch gauge and a reflux temperature of about −130° F. is employed. Under these conditions an overhead gas containing about 40% hydrogen, 50% methane, and 10% $C_2$ and heavier hydrocarbons is formed. This gas is removed from demethanizer 33 by means of line 34 and passed through reflux condenser 35 which may be refrigerated by evaporating ethylene to form liquid reflux for the column which is introduced thereinto by means of line 36. The remaining portion of overhead gas is passed by means of line 37 to selective adsorption column 38 for processing as hereinafter more fully described.

Demethanizer 33 produces as a bottoms fraction a liquid product at about 100° F. containing substantial quantities of normally gaseous hydrocarbons including ethylene, acetylene, propylene and butenes. A portion of this liquid removed by means of line 39 is passed by means of line 40 through reboiler 41 to provide heat to the bottom of the column. The remaining portion of the bottoms product containing substantial quantities of ethylene, acetylene, propylene, and the like, is subsequently passed by means of line 42 controlled by valve 43 into line 44 by means of which it is introduced into ethylene column 45. Ethylene column 45 may operate at pressures in the range of 400 pounds per square inch gauge, and employ a reflux temperature of about 0° F. The overhead gas product from this column is removed by means of line 46, a portion of which is condensed in reflux condenser 47 to provide reflux to the ethylene column. This liquid is removed by means of line 48 into the top of the tower while the remaining uncondensed overhead is passed by means of line 49 through control valve 50 and is sent by means of line 51 to further processing or storage facilities, not shown. This gas product comprises an ethylene stream of 95% purity or higher.

The bottoms product produced from ethylene column 45 comprises ethane and higher molecular weight hydrocarbons. This material is removed by means of line 52 and a portion is passed through lines 53 and 54 through reboiler 55 wherein vapors at a temperature of about 115° F. are produced and introduced by means of line 56 into the bottom of the ethylene column. The remaining portion of the bottoms product may be passed through line 57 controlled by valve 58 and sent by means of line 59 to facilities for storage or further processing, not shown. Desirably, however, the remaining portion is sent by means of line 59 to further fractionation facilities wherein the other individual unsaturated hydrocarbon compounds are recovered in substantially pure form. For example, an ethane tower may be provided to produce an overhead product containing 95% ethane and a bottoms product containing better than 90% C₃ including propylene and propane. If desirable, this material may be passed by means of line 60 controlled by valve 61 through line 62 into a pyrolysis zone for treating normally gaseous hydrocarbons such as cracking zone 120 as hereinafter more fully described.

Returning now to the demethanizer 33 overhead gas stream, this gas comprises feed gas stream to selective adsorption column 38. This mixture may be supplemented, if desirable, by other light cracked gases from other sources such as thermal or catalytic liquid or vapor phase cracking units by means of line 64 controlled by valve 65. The resulting mixture is passed by means of line 66 and depressured through valve 67 to about 75 pounds per square inch gauge. The gaseous mixture is further preheated in exchange with the demethanizer feed by means of a heat interchanger, not shown. The gaseous mixture is introduced into selective adsorption column 38 by means of lines 68 and 69 controlled by valve 70.

By way of a practical example, the description of the operating conditions of selective adsorption column 38 will be described in considerable detail. In one typical operation the feed gas thus produced from demethanizer 33 and introduced into selective adsorption column 38 had the following composition:

TABLE 1

*Feed gas analysis*

| Component | Mol Percent |
|---|---|
| Hydrogen | 39.8 |
| Nitrogen | 1.7 |
| Carbon Monoxide | 0.9 |
| Oxygen | 0.1 |
| Methane | 51.3 |
| Carbon Dioxide | 0.2 |
| Acetylene | 0.2 |
| Ethylene | 5.8 |
| Ethane | Trace |
| | 100.0 |

This feed gas is introduced at a pressure of 75 pounds per square inch gauge at a temperature of 100° F. into selective adsorption column 38. Selective adsorption column 38 is a self-supporting tower 85 feet in height and 4.5 feet in diameter. The adsorbent employed is activated coconut charcoal and is circulated at a rate of about 18,000 pounds per hour. This charcoal flows downwardly through the column by gravity as a moving bed and is removed from the bottom of the column and is conveyed by means of line 71 to the top of the column.

The feed gas is introduced into feed gas engaging zone 71 to pass upwardly countercurrent to the downwardly flowing charcoal in adsorption zone 72. The ethylene, acetylene, carbon dioxide, and ethane, together with a small proportion of methane is adsorbed to form a rich charcoal at a temperature of 150° F. leaving a lean gas containing the less readily adsorbable constituents. The lean gas thus formed passes upwardly out of adsorption zone 72 and a portion of this is removed as the lean gas product from lean gas disengaging zone 73 by means of line 74 controlled by valve 75 and is sent to production or storage, or further processing facilities, not shown. The volumetric flow rate of this lean gas product in the particular run was 44,825 standard cubic feet per hour and had the following composition.

TABLE 2

*Lean gas analysis*

| Component | Mol Percent |
|---|---|
| Hydrogen | 31.6 |
| Nitrogen | 1.4 |
| Carbon Monoxide | 0.8 |
| Oxygen | 0.1 |
| Methane | 66.1 |
| Carbon Dioxide | |
| Acetylene | |
| Ethylene | |
| Ethane | |
| | 100.0 |

If desired, a second selective adsorption column, not shown, may be employed to effect a highly efficient separation between hydrogen and methane of the lean gas product. A substantially complete separation of these two components may be effected for the production of 100% pure hydrogen and better than 95% pure methane. If desired, in this selective adsorption column, not shown, wherein the lean gas product is separated a third or side cut fraction may be obtained which contains the nitrogen, carbon monoxide and oxygen as a substantially pure fraction thus permitting the production of 100% hydrogen and 99.5% or better, methane as product streams.

The remaining portion of the lean gas product not removed from lean gas product disengaging zone 73 passes upwardly through the tubes of cooling zone 76 countercurrent to the downwardly flowing lean charcoal. This gas serves to saturate the lean cool charcoal with the methane constituent present in the lean gas product thereby generating and dissipating part of the heat of adsorption and also to dehydrate the lean charcoal. Due to the adsorption of methane a partial enrichment of this purge gas occurs increasing the concentration of the less readily adsorbable constituents, principally hydrogen. The composition of the gas leaving the upper portion of selective adsorption column 38 by means of lift gas return line 77 had the following composition in this operation:

TABLE 3

*Purge gas analysis*

| Component | Mol Percent |
| --- | --- |
| Hydrogen | 61.8 |
| Nitrogen | 2.5 |
| Carbon Monoxide | 1.3 |
| Oxygen | 0.2 |
| Methane | 33.7 |
| Carbon Dioxide | 1.0 |
| Acetylene | 0.4 |
| Ethylene | |
| Ethane | |
| | 100.0 |

This gas was removed from the system at a rate of 24,600 standard cubic feet per hour as a light fraction through line 78 controlled by valve 79.

This purge gas comprises that portion of the lean gas passing upwardly through the tubes of cooling zone 76 together with the lift gas employed to convey charcoal removed from the lower portion of the selective adsorption column through lift line 77a to the upper portion of the column. Thus, this gas is removed by means of line 77 under suction exerted by lift gas blower 80 and is recirculated at a rate of about 271,000 standard cubic feet per hour through lift line 77a, impactless separator 81, transfer line 82, and is reintroduced into the top of the column. The lift gas has approximately the composition given in Table 3.

The rich charcoal formed in adsorption zone 72 passes downwardly into primary rectification zone 83 at a temperature of about 210° F. The temperature is increased from 150° F. due to the adsorption of a rich gas reflux comprising substantially pure ethylene. The ethylene in the reflux gas is substantially completely adsorbed causing the preferential desorption of the small quantity of methane and lower molecular weight constituents adsorbed on the rich charcoal leaving a rectified charcoal. The rectified charcoal thus formed passes downwardly through secondary rectification zone 84 into steaming zone 85. Immediately above secondary rectification zone 84 is shown side cut disengaging zone 86 and side cut production line 87 controlled by valve 88. Valve 88 for the present purpose is closed and no gas is removed. Primary and secondary rectification zones 83 and 84, respectively, therefore perform as a single rectification zone. If desirable hydrogen may be produced as the lean gas product, and methane as a side cut gas product.

The rectified charcoal introduced into steaming zone 85 is substantially completely stripped of adsorbed ethylene by the preferential adsorption of stripping steam which causes the temperature of the charcoal in steaming zone 85 to increase to about 365° F. The ethylene thus desorbed passes upwardly into rich gas disengaging zone 89.

The partially stripped charcoal passes downwardly from steaming zone 85, heating zone 90, wherein the charcoal within the tubes is indirectly heated by means of flue gas or condensing vapors such as steam or mixtures of diphenyl or diphenyl oxide on the outside of the tubes in heating zone 90. The thus heated charcoal is contacted by a stripping gas such as steam introduced below heating zone 90 through line 91 controlled by valve 92. About 400 pounds per hour of steam is sufficient to effect a substantially complete desorption of remaining ethylene from the charcoal which is heated to a temperature of 510° F. in heating zone 90. The ethylene thus desorbed passes upwardly into rich gas disengaging zone 89 to combine with that desorbed in steaming zone 85.

A portion of the thus desorbed ethylene passes upward into rectification zones 83 and 84 as the rich gas reflux previously described and the remainder of the ethylene is removed as a rich gas by means of line 93 controlled by valve 94 from selective adsorptive column 38 and is passed by means of line 95 into rich gas product cooler 96 wherein the stripping steam is condensed and the ethylene product is cooled. The cooled material passes by means of line 97 into separator 98 from which the condensate is removed through line 99 controlled by valve 100 actuated by a liquid level controller, not shown.

The cooled ethylene product was produced from separator 98 through line 101 controlled by valve 102 at a rate of 4475 standard cubic feet per hour. The ethylene or rich gas product thus produced is passed by means of lines 103, 104 and 105, controlled by valve 106 and through line 107 into drier 108 wherein traces of stripping steam are removed. The dried ethylene product thus produced is passed by means of line 109 to further processing or storage facilities not shown.

The rich gas product produced at a rate of 4475 standard cubic feet per hour had the following composition:

TABLE 4

*Rich gas product analysis*

| Component | Mol Percent |
| --- | --- |
| Hydrogen | |
| Nitrogen | |
| Carbon Monoxide | |
| Oxygen | 0.1 |
| Methane | |
| Carbon Dioxide | 2.9 |
| Acetylene | 3.6 |
| Ethylene | 92.7 |
| Ethane | 0.7 |
| | 100.0 |

A separation of acetylene from the methane and less readily adsorbable constituents has been made as well as a separation of carbon dioxide from carbon monoxide.

In general it is desirable by means of line 110 controlled by valve 111 to combine the ethylene product produced from selective adsorption column 38 with the ethylene product produced from ethylene distillation column 45 which is produced through line 51. Drier 108 may comprise any form of a drier suitable for dehydrating gases. A successful way in which this ethylene product was dehydrated was by passing it through towers packed with activated aluminum oxide, although other desiccants such as activated calcium sulfide, calcium chloride, silica gel, desiccants may be employed or the gas may be dehydrated by bubbling it through extractants such as ethylene glycol, and the like.

The operation of selective adsorption column 38 in processing demethanizer 33 overhead product shows, beside the recovery of ethylene, the separation of carbon monoxide from carbon dioxide. In the above operation and as shown by the lean gas and rich gas product analyses, an efficient carbon monoxide-carbon dioxide separation was obtained, the rich gas product being uncontaminated with carbon monoxide and the lean gas product being uncontaminated with carbon dioxide. Such a process lends itself very well to the recovery of both of these gases from gaseous mixtures obtained as flue gas or those gases deliberately formed by controlling combustion conditions to generating large quantities of carbon monoxide or the recovery of pure carbon monoxide and carbon dioxide products from virtually any mixture in which they are present. The selective adsorption process may therefore be applied to the purification of carbon dioxide from such mixtures as synthesis gas, etc.

In other specialized operations in which dehydration, dehydrogenation, or partial combustion in place of thermal pyrolysis is occurring so that the conversion of the hydrocarbon feed stock is principally one for the formation of acetylene, the selective adsorption process as hereinabove described may easily be adapted to the recovery of that component. Acetylene-containing gases may be produced also by passing the feed stock which may comprise natural gas or other gaseous hydrocarbon fractions through a high temperature electric arc, in which acetylenes and other unsaturated components are formed in considerable quantity. In such operations the acetylene content of the gaseous mixture may be as high as about 10% by volume and a highly efficient recovery of this component may be obtained.

The rich gas product produced as above described from selective adsorption column 38 may in turn be treated for the recovery of acetylene by the addition of another selective adsorptive column, not shown, or by the addition of equipment which is adaptable to the solvent extraction of acetylene from the rich gas ethylene product. The acetylene may be recovered as an extract, or as a precipitate such as an acetylide formed through reaction of acetylene with metals such as copper and silver under carefully controlled conditions. If desired, the product gas may thus be treated at low temperatures under which conditions acetylene is readily separable as a solid phase. Preferably, however, this acetylene is recovered by continuous selective adsorption since operating conditions of pressure and temperature are very moderate.

It has also been found that a stripping gas rate may be maintained in steaming zone 85 and heating zone 90 of selective adsorption column 38 giving a gas velocity which is sufficient to at least partially fluidize the adsorbent flowing downwardly therethrough. These partially fluidized solids have a dynamic bulk density which is less than the static bulk density of the adsorbent at rest or moving in countercurrent contact with gases of lower velocities. The individual adsorbent granules apparently separate somewhat under such higher countercurrent gas flow rates which retard gravity flow and partially fluidize the solids. For example, the static bulk density of 10 to 30 mesh granular charcoal is about 35 pounds per cubic foot and the dynamic bulk density varies from about 50% to as high as about 95% of this value during high countercurrent gas flow rates as are encountered in the adsorption zone, rectification zones, and especially in the tubular heating zone.

It is apparent, however, that a highly efficient countercurrent contact of stripping gas with the partially fluidized adsorbent of decreased dynamic bulk density is thus obtained in the tubular heating zone since a more complete desorption of adsorbed constituents from the adsorbent is obtained with equivalent amounts of stripping gas over shorter periods of contact time.

An unusual countercurrent contact of a partially fluidized solid with a gas is thus obtained in the heating zone of selective adsorption column 38 when stripping gas rates are employed which approach the theoretical maximum at which the downward gravity flow of adsorbent is stopped. The adsorbent granules are apparently free to move laterally within the vertical tubes, but are inhibited from movement up or down the length of the tubes.

The state of the granules in the adsorbent bed is not that of the state of hindered settling found in the conventional fluidized solids systems such as in fluid catalytic cracking and fluid catalyst regeneration in which only one contact stage is realized. A multistage countercurrent gas-solid contact is obtained according to this invention in which the gas at one end of the tubes, while in equilibrium with the adsorbent at that point is not in equilibrium with the adsorbent at the other end of the tube, nor with the adsorbent along the length of the tube.

For example, the static bulk density of adsorbent employed in selective adsorption column 38 is between 35 and 40 pounds per cubic foot and the dynamic bulk density of adsorbent passing through tubular heating zone 90 in countercurrent contact with 375 pounds per hour of stripping steam introduced plus about 1200 pounds per hour of internal stripping steam recycle varies from about 20 to about 35 pounds per cubic foot.

These principles may be applied to the countercurrent contacting of the adsorbent in adsorption zone 72 in which increased contact efficiency results as well as to the rectification zones between the adsorption zone and heating zone.

Referring again to the accompanying drawing, the operation of the selective adsorption column in conjunction with a pyrolysis operation for conversion of normally gaseous feed stocks to unsaturated hydrocarbons is also shown. Such gaseous mixtures of unsaturated hydrocarbons may also be obtained from other cracking operations as well.

In this modification, gas pyrolysis zone 120, labeled "Gas cracker," is provided. Between about 2% and 30% by weight of water or steam may be introduced via line 126a controlled by valve 127a into zone 120 with the gaseous hydrocarbon feed. A coil outlet temperature of between 1000° F. and 2500° F. may be used, and with an ethane feed a temperature of between about 1300° F. and 1900° F. at pressures less than about 100 pounds per square inch gauge are applicable.

Low molecular weight normally gaseous hydrocarbons such as ethane, propylene, propane, and any $C_4$ hydrocarbons are thermally decomposed in gas pyrolysis zone 120 for the production of further quantities of unsaturated low molecular weight hydrocarbons. An effluent is produced which comprises a gaseous mixture of low molecular weight unsaturated hydrocarbons together with hydrogen. The effluent passes by means of line 130 into cooler 131 which may comprise an interchanger permitting transfer of heat from the effluent to the feed streams entering pyrolysis zone 120, or a quench, or the like. The cooled effluent is subsequently passed by means of line 132 controlled by valve 133 through line 134 and line 69 controlled by valve 70 into selective adsorption column 38. The products removed comprise a lean gas product overhead, a rich gas product as bottoms, and a side cut gas product which may comprise a $C_2$ hydrocarbon fraction as hereinafter more fully described. The lean gas product passing through line 74 controlled by valve 75 comprises a mixture of hydrogen and methane, the least readily adsorbable gases, as the principal components. A side cut gas product is removed through line 87 controlled by valve 88 containing $C_2$ hydrocarbon of intermediate adsorbability and a rich gas product is produced which comprises propylene and propane together with a minor proportion of $C_4$ and heavier hydrocarbons as most readily adsorbable gases. The $C_2$ hydrocarbon side cut is passed by means of line 121 into drier 122 in which traces of moisture are removed. Solid desiccants may be employed such as activated aluminum oxide, silica gel, and the like. The dried side cut gas is then refrigerated by means not shown and the feed stream is introduced by means of line 44 into ethylene fractionator 45 which as previously described produces an overhead ethylene product and a bottoms ethane product. The ethane thus separated is passed by means of line 60 controlled by valve 61 through line 62 into pyrolysis zone 120.

The rich gas product produced from selective adsorption column 38 under these conditions comprises propylene and propane and $C_4$ hydrocarbons. If ethylene is the principally desired product, the entire rich gas product from selective adsorption column 38 may be removed from separator 98 by means of line 101 controlled by valve 102 and passed by means of line 123 controlled by valve 124 through line 125 controlled by valve 126 and passed through line 127 into gas pyrolysis zone 120. If desired, the rich gas product may be passed by means of line 128 controlled by valve 129 to further processing facilities not shown which may comprise another selective adsorption column in which propylene is recovered as a substantially pure lean gas product and the $C_4$ hydrocarbons as a rich gas product.

The following data are given as a typical example of an operation involving pyrolysis of low molecular weight normally gaseous hydrocarbons and subsequent separation of the gaseous effluent by means of the selective adsorption.

The pyrolysis zone 120 produces an effluent which may be combined with dried cracked gas obtained from conventional refinery cracking operations, to produce a gaseous mixture having the following composition:

TABLE 5

*Selective adsorber feed gas*

| Component | Mol Percent |
|---|---|
| Hydrogen | 11.9 |
| Methane | 35.5 |
| Ethylene | 13.2 |
| Ethane | 25.2 |
| Propylene | 4.4 |
| Propane | 8.3 |
| $C_4$'s+ | 1.5 |
|  | 100.0 |

This gas passes upwardly through adsorption zone 72 and the ethylene and higher molecular weight hydrocarbons are adsorbed forming a rich charcoal leaving a lean gas containing hydrogen and methane as principal ingredients as a substantially unadsorbed gas. This gaseous mixture is removed from lean gas disengaging zone 73 as a lean gas product, a portion of which passes upwardly through the cooling zone as previously described. The lean gas product thus formed has the following composition:

TABLE 6

*Lean gas analysis*

| Component | Mol Percent |
|---|---|
| Hydrogen | 25.4 |
| Methane | 73.9 |
| Ethylene | 0.4 |
| Ethane | 0.3 |
| Propylene | ---------- |
| Propane | ---------- |
| $C_4$+ | ---------- |
|  | 100.0 |

The rich charcoal formed in adsorption zone 72 passes downwardly into primary rectification zone 83 in which the rich charcoal is contacted with a side cut reflux gas containing a high concentration of $C_2$ hydrocarbons. The rich charcoal is rectified and ethylene and ethane are adsorbed effecting the preferential desorption of substantially all of the adsorbed methane which passes upwardly into adsorption zone 72 and leaving an enriched charcoal. The enriched charcoal, substantially free of constituents lighter than ethylene, passing downwardly into secondary rectification zone 84 wherein it is contacted with a countercurrent flow of rich gas reflux. A preferential desorption of $C_2$ hydrocarbons results forming a side cut gas containing a high concentration of $C_2$ hydrocarbons. A portion of this passes upwardly into primary rectification zone 83 to serve therein as the side cut reflux and the remainder is removed from side cut gas disengaging zone 86 through line 87 controlled by valve 88 as a side cut gas product. This side cut gas is cooled and dehydrated in drier 122 and is passed as feed stock into ethylene distillation column 45. The side cut gas product from the selective adsorption column has the following composition:

TABLE 7
*Side cut gas analysis*

| Component | Mol Percent |
|---|---|
| Hydrogen | |
| Methane | 2.7 |
| Ethylene | 37.9 |
| Ethane | 58.3 |
| Propylene | 0.4 |
| Propane | 0.7 |
| | 100.0 |

The ethane bottoms product produced from ethylene distillation column 45 is returned as previously described through lines 55 and 60 controlled by valve 61 and line 62 to gas pyrolysis zone 120 for the formation of further quantities of unsaturated hydrocarbons.

The enriched charcoal, stripped of the side cut product gas in secondary rectification zone 84 by means of a rich gas reflux, forms a rectified charcoal which is substantially free of adsorbed $C_2$ hydrocarbons but contains substantial quantities of $C_3$ hydrocarbons together with some $C_4$ hydrocarbons. This rectified charcoal passes downwardly into steaming zone 85 wherein pressure preferential adsorption of stripping steam causes the adsorption of a major proportion of the adsorbed constituents which pass upwardly into rich gas disengaging zone 89. A portion of this desorbed gas passes upwardly into secondary rectification zone 84 to serve therein as reflux while the remaining portion is removed as a rich gas product through line 93 controlled by valve 94 together with stripping steam as previously described. This gas containing steam is cooled, the steam condensed, the condensate separated from the rich gas product, and the product is returned by means of line 101 controlled by valve 102, lines 103 and 123 controlled by valve 125, line 125 controlled by valve 126, and through line 127 into pyrolysis zone 120. This rich gas product has the following composition:

TABLE 8
*Rich gas analysis*

| Component | Mol Percent |
|---|---|
| Hydrogen | |
| Methane | |
| Ethylene | 1.8 |
| Ethane | 3.5 |
| Propylene | 29.4 |
| Propane | 54.2 |
| $C_4^+$ | 11.1 |
| | 100.0 |

As previously described, this selective adsorption column rich gas product may be further treated by an additional selective adsorption column not shown for the recovery of propylene in which case the $C_4$ fraction may be returned to pyrolysis zone 120 and the $C_3$ hydrocarbon fraction sent to storage or further processing facilities not shown.

The overhead from ethylene fractionator 45 for the separation just described has the following composition:

TABLE 9
*Ethylene fractionator overhead*

| Component | Mol Percent |
|---|---|
| Hydrogen | |
| Methane | |
| Ethylene | 6.4 |
| Ethane | 86.4 |
| Propylene | 7.2 |
| Propane | |
| | 100.0 |

As may be noted from the composition given in Tables 4 and 9 the ethylene fraction produced by fractional distillation is a lower degree of purity than the ethylene fraction produced as previously described as the selective adsorption column rich gas product. Comparison of the two methods for ethylene recovery immediately shows the inherent advantage of employing selective adsorption as a method for ethylene recovery since the pressure conditions required in the selective adsorption process are much more moderate and no refrigeration is necessary.

If desired, another modification of this invention involves the use of a doubly rectified side cut operation in selective adsorption column 38 in which a side cut gas product analyzing 99% by volume or better of $C_2$ hydrocarbons is obtained. The mechanical details of such a doubly rectified side cut apparatus are more clearly described and claimed in the copending application of Clyde H. O. Berg, Serial No. 751,320, filed May 29, 1947, now U. S. Patent No. 2,519,874, patented August 22, 1950. When employing this modification of selective adsorption apparatus the ethylene concentration in the overhead product of ethylene distillation column 45 may be raised to 99.5% or better.

The selective adsorption column 38 shown in the accompanying drawing is also provided with an auxiliary charcoal stripping zone in which a small proportion of the charcoal circulation rate is passed to subject the charcoal to a high temperature steam treatment. This continuously removed small proportions of polymers and other high molecular weight substances including traces of absorption oil, and the like, from the surface of the adsorbent tending to maintain a high degree of adsorption capacity of the charcoal. This high temperature steam treatment is generally subjected to about 5% by weight per hour of the main selective adsorption column charcoal circulation, although from as low as 1% to as high as 20% may be so treated. The charcoal employed in the selective adsorption process is preferably granular and having a mesh size of between about 10 and 30 mesh, although particles as large as about 4 mesh to as small as about 100 mesh or smaller may be employed in special instances. The preferred type of charcoal comprises that which is prepared from vegetable sources such as coconut hulls, fruit pits, and the like, although other animal, vegetable, or mineral carbons which have been treated to impart adsorptive characteristics may be employed. It is not outside the scope of the present invention, however, to employ other adsorbents than charcoal since adsorbents such as activated aluminum oxide, silica gel and inorganic adsorbents prepared from oxides and hydroxides of various other metals may be employed.

Operating pressures of the selective adsorption process herein described vary between zero and 250 pounds per square inch gauge in effecting the separations of cracked gases employed as examples in this specification. Operating pressures in the range of about 50 to 150 pounds per square inch are preferable and about 75 pounds per square inch gauge in particular has been found suitable for separating ethylene as a rich gas product. The selective adsorption apparatus, however, may be operated at virtually any pressure from subatmospheric pressures to superatmospheric pressures as high as 1000 pounds per square inch depending upon the nature and composition of the gas to be separated.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. A process for the conversion of normally liquid hydrocarbon oils to normally gaseous unsaturated hydrocarbons which comprises distilling an ethylene-containing gaseous mixture obtained from cracking of said normally liquid hydrocarbons to obtain a first overhead product containing a major proportion of hydrogen and methane and a minor proportion of ethylene leaving a first bottoms product containing ethylene, ethane and higher molecular weight hydrocarbons, redistilling said first bottoms product in a separate distillation zone to recover ethylene, contacting said overhead product with a moving bed of activated charcoal to adsorb ethylene leaving hydrogen and methane substantially unadsorbed as a lean gas product, and desorbing the ethylene thus adsorbed.

2. In a process for the production of normally gaseous unsaturated hydrocarbons from normally liquid hydrocarbons which comprises distilling an ethylene-containing gaseous mixture obtained from cracking of said normally liquid hydrocarbons to obtain a first overhead product consisting essentially of hydrogen and methane and a first bottoms product consisting essentially of acetylene, ethylene, and higher molecular weight hydrocarbons, redistilling said bottoms product in a separate distillation zone to recover acetylene and ethylene from uncracked hydrocarbon oil, and combining the uncracked hydrocarbon oil with said hydrocarbon oil to be cracked, the improvement which comprises allowing at least a portion of said acetylene and ethylene to be produced in said overhead product to reduce refrigeration required in condensing a part of said overhead to product reflux, and contacting the uncondensed portion of said overhead product with a moving bed of solid granular adsorbent to recover said ethylene.

3. A process for the production of normally gaseous unsaturated hydrocarbons which comprises distilling a cracked gaseous mixture containing said unsaturated hydrocarbons in admixture with less readily adsorbable gases and more readily adsorbable gases to recover a first overhead consisting essentially of a minor proportion of said unsaturated hydrocarbons and a major proportion of less readily adsorbable gases leaving a first bottoms product containing said unsaturated hydrocarbons and more readily adsorbable saturated hydrocarbons, redistilling said first bottoms product in a separate distillation zone to obtain a second overhead product comprising said unsaturated hydrocarbon and a second bottoms product comprising less volatile saturated hydrocarbons, cracking said second bottoms product to obtain a gaseous effluent containing additional amounts of said unsaturated hydrocarbons, continuously contacting a mixture of said gaseous effluent and said overhead product with a moving bed of solid granular adsorbent to adsorb said unsaturated hydrocarbons and more readily adsorbable material, leaving less readily adsorbable gases as a least readily adsorbable fraction, contacting the resulting adsorbent with a reflux gas of most readily adsorbable hydrocarbons to preferentially desorb said unsaturated hydrocarbons together with saturated hydrocarbons of similar degree of adsorbability as a side cut gas of intermediate degree of adsorbability, desorbing remaining adsorbed material as a third fraction of greater degree of adsorbability, combining said fraction of intermediate adsorbability with said first bottoms fraction for recovery of the unsaturated hydrocarbon, and combining at least part of the fraction of higher degree of adsorbability with the second bottoms fraction for further cracking.

4. A process for the production of an unsaturated hydrocarbon having less than 5 carbon atoms per molecule from a liquid feed consisting essentially of hydrocarbons containing at least 5 carbon atoms per molecule, which comprises cracking said liquid feed, distilling the effluent from the cracking operation to obtain a first overhead fraction consisting essentially of a minor proportion of the desired unsaturated hydrocarbon together with a major proportion of less readily adsorbable gases, and a first bottoms fraction comprising the remainder of the desired unsaturated hydrocarbon together with more readily adsorbable material, contacting the first overhead fraction with a solid granular adsorbent so as to adsorb the desired unsaturated hydrocarbon and separate it from the less readily adsorbable material, and redistilling the first bottoms fraction in a separate distillation zone to obtain a second overhead fraction comprising the desired unsaturated hydrocarbon and a second bottoms fraction comprising saturated hydrocarbons of lower volatility.

5. A process according to claim 4 in which a portion of the second bottoms fraction containing saturated hydrocarbons is cracked to produce additional amounts of the desired unsaturated hydrocarbon, the gaseous effluent from the latter cracking operation is combined with said first overhead fraction, and the combined stream is contacted with a solid granular adsorbent so as to adsorb the desired unsaturated hydrocarbon and separate it from the less readily adsorbable material.

6. A process according to claim 5 in which the contacting with the solid granular adsorbent is carried out continuously and in a manner so as to adsorb the desired unsaturated hydrocarbon and more readily adsorbable material leaving less readily adsorbable gases as a least readily adsorbable fraction, the resulting adsorbent is contacted with a reflux gas of more readily adsorbable material to preferentially desorb the desired unsaturated hydrocarbon together with saturated hydrocarbons of similar degree of adsorbability as a side cut gas of intermediate degree of adsorbability, the remaining adsorbed material is desorbed as a third fraction of greater degree of adsorbability, and the fraction of intermediate adsorbability is combined with the first bottoms fraction for recovery of the unsaturated hydrocarbon by redistillation.

7. A process according to claim 6 in which at least part of the third fraction of greater degree of adsorbability is combined with the second bottoms fraction for further cracking.

8. A process according to claim 4 in which the second bottoms fraction is combined with the liquid feed for further cracking.

CLYDE H. O. BERG.
    DONALD H. IMHOFF.

References Cited in the file of this patent

UNITED STATES PATENTS

| Number | Name | Date |
|---|---|---|
| 1,422,007 | Soddy | July 4, 1922 |
| 1,825,707 | Wagner | Oct. 6, 1931 |
| 2,154,676 | Haeuber et al. | Apr. 18, 1939 |
| 2,168,610 | Schutt | Aug. 8, 1939 |
| 2,230,219 | Carey | Feb. 4, 1941 |
| 2,263,557 | Greenewalt | Nov. 25, 1941 |
| 2,376,425 | Frey | May 22, 1945 |
| 2,384,311 | Kearby | Sept. 4, 1945 |
| 2,390,536 | Houdry et al. | Dec. 11, 1945 |
| 2,498,806 | Hachmuth | Feb. 28, 1950 |
| 2,500,353 | Gantt | Mar. 14, 1950 |
| 2,519,342 | Berg | Aug. 22, 1950 |
| 2,519,873 | Berg | Aug. 22, 1950 |
| 2,529,289 | Gilliland | Nov. 7, 1950 |